(12) United States Patent
Yoon et al.

(10) Patent No.: US 12,113,397 B2
(45) Date of Patent: Oct. 8, 2024

(54) ACTIVELY CONTROLLABLE SIX-DEGREE-OF-FREEDOM MOTOR DEVICE AND A MOTOR SYSTEM HAVING THE SAME

(71) Applicant: UIF (University Industry Foundation), Yonsei University, Seoul (KR)

(72) Inventors: JunYoung Yoon, Seoul (KR); HyeongMin Yoon, Goyang-si (KR); JaeHong Min, Seoul (KR); YoonSik Kwon, Seoul (KR); SangWon Jung, Gunpo-si (KR); WonTaek Song, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 287 days.

(21) Appl. No.: 17/929,582

(22) Filed: Sep. 2, 2022

(65) Prior Publication Data
US 2023/0062284 A1 Mar. 2, 2023

(30) Foreign Application Priority Data
Sep. 2, 2021 (KR) .......................... 10-2021-0116677

(51) Int. Cl.
  *H02K 1/14* (2006.01)
  *H02K 1/27* (2022.01)
  *H02K 3/18* (2006.01)
(52) U.S. Cl.
  CPC .................. *H02K 1/14* (2013.01); *H02K 1/27* (2013.01); *H02K 3/18* (2013.01)

(58) Field of Classification Search
  CPC .......... H02K 1/14; H02K 1/27; H02K 1/2791; H02K 21/222; H02K 2201/18; H02K 3/18; H02K 41/031
  See application file for complete search history.

(56) References Cited

U.S. PATENT DOCUMENTS

| 8,714,948 B2 * | 5/2014 | Baba .................... H02K 21/16 |
| | | 310/216.106 |
| 2005/0099082 A1 * | 5/2005 | Nashiki ................ H02K 21/145 |
| | | 310/257 |

FOREIGN PATENT DOCUMENTS

WO WO-2009100448 A1 * 8/2009 ............... H02K 1/16

OTHER PUBLICATIONS

WO-2009100448-A1, Lafontaine et al., all pages (Year: 2009).*

* cited by examiner

*Primary Examiner* — Naishadh N Desai
(74) *Attorney, Agent, or Firm* — NORTON ROSE FULBRIGHT US LLP

(57) ABSTRACT

A motor device includes a stator assembly including a first magnetic coil including first windings wound around an outer face and an inner face of a first support and in a central-axis direction thereof; and a second magnetic coil including second windings wound around a surface of a second support inside or outside the first support and in a circumferential direction thereof; and a rotor assembly including a plurality of first permanent magnets; and a plurality of second permanent magnets including first and second extending magnets magnetized in an opposite direction to a magnetized direction of the first permanent magnets, wherein each of the first and second extending magnets has a length greater than each of the first permanent magnets, wherein the first and second extending magnets are (Continued)

respectively disposed in a first end area and a second end area opposite to each other of the rotor assembly.

11 Claims, 7 Drawing Sheets

Thrust force $F_z$ (1)   Radial force $F_x$ (3)   Radial force $F_y$ (4)

Rotational Torque $T_z$ (2)   Tilting torque $T_x$ (5)   Tilting torque $T_y$ (6)

ACTIVELY CONTROLLABLE SIX-DEGREE-OF-FREEDOM MOTOR DEVICE AND A MOTOR SYSTEM HAVING THE SAME

CROSS-REFERENCE TO RELATED APPLICATION

This application claims a benefit under 35 U.S.C § 119(a) of Korean Patent Application No. 10-2021-0116677 filed on Sep. 2, 2021, on the Korean Intellectual Property Office, the entire disclosure of which is incorporated herein by reference for all purposes.

BACKGROUND

1. Field

The present disclosure relates to a motor device having a magnetic bearing function and capable of simultaneously performing rotation and linear motions, and a motor system having the same.

2. Description of Related Art

A linear/rotation combined actuator that moves a moving object in a Z-axis direction and rotates around the Z-axis may be assembled into an industrial robot, a transport device, etc. For example, a head shaft of a chip mounter is required to linearly move a moving object such as a suction pad for adsorbing an electronic component, a tool, etc. in a Z-axis direction or rotate the body around the Z-axis. The linear motion of the moving object in the Z-axis direction is required to mount the electronic component on a surface of a printed circuit board, and the rotational motion of the moving object in a θ direction is required to position a rotation angle of the electronic component.

A linear/rotary combined pulse motor in which a conventional linear pulse motor and a conventional rotary pulse motor are combined with each other in an axial direction has been developed as the linear/rotation combined actuator capable of the linear motion and the rotational motion. In such a linear/rotary combined pulse motor, a rotor of the rotary pulse motor is embodied as a hollow shaft, and a spline bearing provided with a rotation prevention mechanism is disposed in the hollow shaft. However, in the conventional linear/rotary combined pulse motor, mechanical bearings are used and linear and rotation motion drivers are connected in series to each other, so that a length of a system in the axis direction is increased.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a motor device having a rotor assembly of a single structure capable of simultaneously performing a magnetic bearing function, a rotational motion and a linear motion.

Another purpose of the present disclosure is to provide a motor system having the motor device.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

One aspect of the present disclosure provides a motor device comprising: a stator assembly including: a first support in a form of a circular cylinder; a first magnetic coil including first windings wound around an outer face and an inner face of the first support and in a direction parallel to a first direction as a central-axis direction of the first support; a second support in a form of a circular cylinder disposed inside or outside the first support; and a second magnetic coil including second windings wound around a surface of the second support and in a circumferential direction of the second support; and a rotor assembly including a permanent magnet array, wherein the array includes: a plurality of first permanent magnets magnetized in a positive or negative radial direction; and a plurality of second permanent magnets including first and second extending magnets magnetized in an opposite direction to the magnetized direction of the first permanent magnets, wherein each of the first and second extending magnets has a length greater than each of the first permanent magnets, wherein the first and second permanent magnets are arranged symmetrically about the central-axis and are arranged in a form of a circular cylinder surrounding the stator assembly, wherein the first and second extending magnets are respectively disposed in a first end area and a second end area opposite to each other of the rotor assembly.

In one implementation of the device, a surface of the first support is divided into a plurality of areas arranged along a circumferential direction thereof and arranged consecutively, wherein the first windings include a plurality of coil groups respectively wound around the plurality of areas, wherein control currents are individually applied to the plurality of coil groups independently of each other.

In one implementation of the device, each of the first and second supports is made of a non-magnetic material.

In one implementation of the device, the rotor assembly further includes a circular cylinder-shaped back cover surrounding the permanent magnet array, wherein an inner face of the back cover is divided into 2N+1 areas (N is a natural number) arranged along a central-axis direction thereof, wherein each of the 2N+1 areas has a width as a first length of each of the first permanent magnets, wherein in an odd-numbered area among the 2N+1 areas, the first permanent magnets are arranged in a line along the circumferential direction and are spaced apart from each other by an equal spacing, wherein each of the first extending magnets extends along first and second areas among the 2N+1 areas, wherein each of the second extending magnets extends along an (2N+1)-th area and an 2N-th area among the 2N+1 areas.

In one implementation of the device, the first and second extending magnets have the same width and the same length, and the length of each of the first and second extending magnets is twice the length of each of the first permanent magnets.

In one implementation of the device, the second permanent magnets further include a plurality of third magnets disposed in at least one even-numbered area of the 2N+1 areas, wherein each of the plurality of third magnets has the same width and the same length as a width and the length of each of the first permanent magnets, respectively.

In one implementation of the device, each of the third magnet is positioned to correspond to a space between adjacent first permanent magnets respectively disposed in adjacent odd-numbered area among the 2N+1 areas.

In one implementation of the device, a first torque for rotating the rotor assembly around a first radial direction and a second torque for rotating the rotor assembly around a second radial direction perpendicular to the first radial direction are generated by the first and second extending magnets.

Another aspect of the present disclosure provides a motor system comprising: a motor device including: a stator assembly including: a first support in a form of a circular cylinder, wherein a surface of the first support is divided into a plurality of areas arranged along a circumferential direction thereof and arranged consecutively; a first magnetic coil including first windings having a plurality of coil groups wound around inner and outer faces of the first support and respectively wound around the plurality of areas of the first support and in a direction parallel to a first direction as a central-axis direction of the first support; a second support in a form of a circular cylinder disposed inside or outside the first support; and a second magnetic coil including second windings wound around a surface of the second support and in a circumferential direction of the second support; and a rotor assembly including a permanent magnet array, wherein the array includes: a plurality of first permanent magnets magnetized in a positive or negative radial direction; and a plurality of second permanent magnets including first and second extending magnets magnetized in an opposite direction to the magnetized direction of the first permanent magnets, wherein each of the first and second extending magnets has a length greater than each of the first permanent magnets, wherein the first and second permanent magnets are arranged symmetrically about the central-axis and are arranged in a form of a circular cylinder surrounding the stator assembly, wherein the first and second extending magnets are respectively disposed in a first end area and a second end area opposite to each other of the rotor assembly; a sensing device for sensing relative positions and motions of the rotor assembly with respect to the stator assembly, and for generating an electrical sensed signal corresponding thereto; a controller configured to: calculate, based on the sensed signal, at least one of: a first target torque for rotating the rotor assembly by a first angle around the central-axis direction of the stator assembly; a second target torque for rotating the rotor assembly by a second angle around a first radial direction thereof; a third target torque for rotating the rotor assembly by a third angle around a second radial direction; a first target force to move the rotor assembly by a first distance in the first radial direction; a second target force for moving the rotor assembly in the second radial direction by a second distance; or a third target force for moving the rotor assembly along the central-axis direction; and calculate control current values to be applied to first to fourth coil groups and the second windings to generate the calculated target torques and forces, wherein the plurality of coil groups include the first to fourth coil groups; and a driver configured to generate control currents from an external power source, based on the calculated control current values and to apply the generated control currents to the first to fourth coil groups and the second windings.

In one implementation of the system, the controller includes: a bearing force/torque calculator for calculating at least one of the second target torque, the third target torque, the first target force, and the second target force, based on the sensed signal; a rotation torque calculator for calculating the first target torque based on the sensed signal; a linear motion force calculator for calculating the third target force based on the sensed signal; a first current calculator for calculating the control current values for generating the first target torque, the second target torque, the third target torque, the first target force, and the second target force calculated by the bearing force/torque calculator and the rotation torque calculator are calculated; and a second current calculator for calculating the control current value for generating the third target force calculated by the linear motion force calculator.

In one implementation of the system, the driver includes: first to fourth current applicators respectively connected to the first to fourth coil groups so as to independently apply the control currents thereto; and a fifth current applicator for applying the control current to the second windings According to the motor device according to the present disclosure and the motor system having the same, the rotor assembly of a single structure may simultaneously perform a magnetic bearing function, a rotational motion and a linear motion. Further, there is no need for an additional bearing system for the rotor assembly. Further, there is no core in the stator assembly, so that there is no cogging phenomenon, and it is easy to manufacture the stator assembly.

In addition to the effects as described above, specific effects in accordance with the present disclosure will be described together with the detailed description for carrying out the disclosure.

DETAILED DESCRIPTIONS

Figure 1:
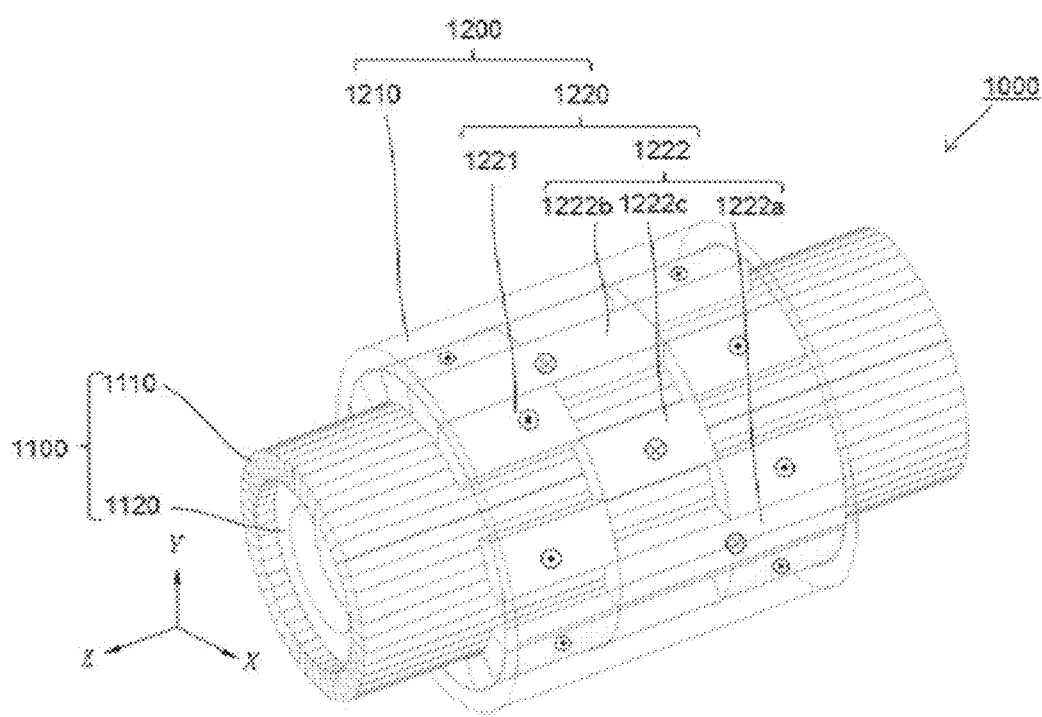
FIG. 1 is a perspective view for illustrating a motor device according to an embodiment of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the figures is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

Figure 2:
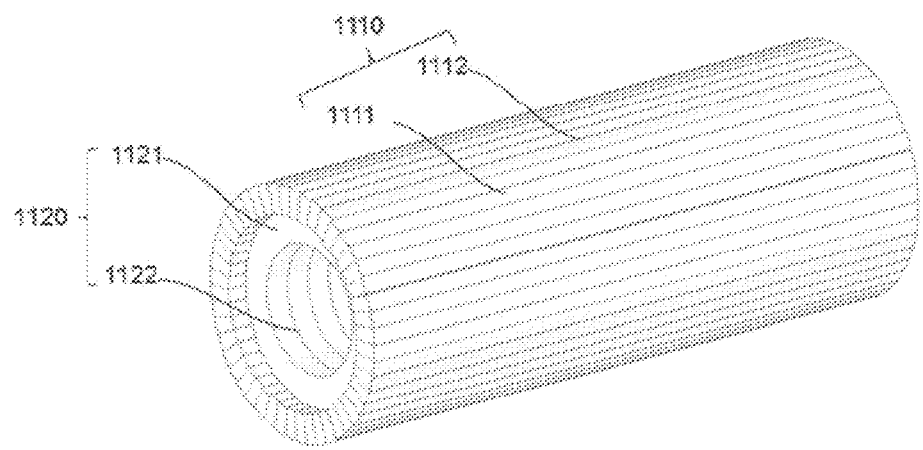
FIG. 2 is a perspective view for illustrating a stator assembly shown in FIG. 1.
Figure 3:
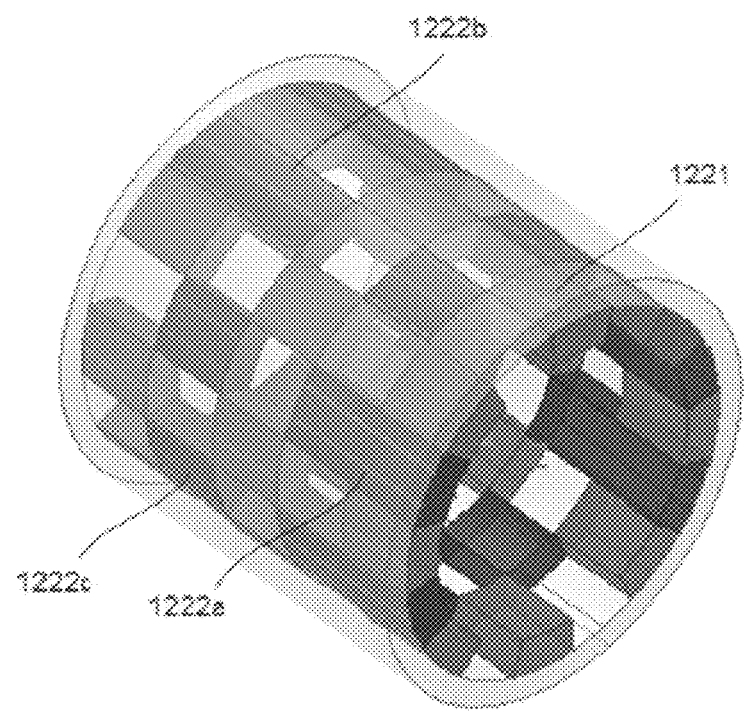
FIG. 3 is a perspective view for illustrating another embodiment of the rotor assembly shown in FIG. 1.

FIG. 1 is a perspective view for illustrating a motor device according to an embodiment of the present disclosure. FIG. 2 is a perspective view for illustrating a stator assembly shown in FIG. 1. FIG. 3 is a perspective view for illustrating another embodiment of the rotor assembly shown in FIG. 1.

Referring to FIG. 1 to FIG. 3, a motor device 1000 according to an embodiment of the present disclosure may include a stator assembly 1100 and a rotor assembly 1200. The stator assembly 1100 may include a first magnetic coil 1110 and a second magnetic coil 1120.

The first magnetic coil 1110 may include a first support 1111 in a form of a circular cylinder having a central-axis in a first direction Z, and first windings 1112 wound around an outer face and an inner face of the first support 1111 in a direction parallel to the first direction Z. The first support 1111 may be made of a non-magnetic material to prevent a cogging phenomenon from occurring. The first windings 1112 may be made of an electrically conductive metal material. The first magnetic coil 1110 interacts with a magnetic flux in a circumferential direction generated in the rotor assembly 1200 to generate torques for rotating the rotor assembly 1200 respectively around the central-axis direction Z, a first radial direction X perpendicular to the central-axis, and a second radial direction Y perpendicular to the central-axis and the first radial direction X, and/or forces for moving the rotor assembly 1200 respectively in the first radial direction X and the second radial direction Y. A detailed description thereof will be described later.

In one embodiment, a surface of the first support 1111 may be divided into a plurality of areas that are arranged along a circumferential direction and continuously. The first windings 1112 may include a plurality of coil groups respectively wound around the plurality of areas. Individual power may be applied to each of the plurality of coil groups independently of each other. For example, the surface of the first support 1111 may be divided into four areas, that is, first to fourth areas which may be arranged along the circumferential direction, and may have an equal width. In this case, the first windings 1112 may include first to fourth coil groups (1112a, 1112b, 1112c, and 1112d in FIG. 9) respectively wound around the first to fourth areas. Each of control currents may be independently applied to each of the first to fourth coil groups. when the first windings 1112 include the plurality of coil groups to which the control currents are independently and respectively applied, each control current applied to each of the coil groups may be controlled such that each of a torque to rotate the rotor assembly 1200 about the central-axis direction Z, a torque to rotate the same about the first radial direction X, a torque to rotate the same about the second radial direction Y, a force to move the same the first radial direction X, and a force to move the same in the second radial direction Y may be independently controlled.

The second magnetic coil 1120 may include a second support 1121 in a form of a circular cylinder having a central-axis in the first direction Z and disposed inside or outside the first support 1111, and second windings 1122 wound around a surface of the second support 1121 and in a circumferential direction. Control currents independent of those applied to the first magnetic coil 1110 may be applied to the second windings 1122. In this case, the second magnetic coil 1120 may interact with a magnetic flux in the central-axis direction Z generated in the rotor assembly 1200 to generate a force for linear motion of the rotor assembly 1200 along the central-axis direction Z.

The rotor assembly 1200 may include a back cover 1210 having a circular cylindrical shape surrounding the stator assembly 1100 and a permanent magnet array 1220 disposed on an inner face of the back cover 1210.

The back cover 1210 may have a circular cylinder shape surrounding the stator assembly 1100. In order to prevent a magnetic flux generated from the permanent magnet array 1220 from leaking to an outside, the back cover may be made of a magnetic material.

The permanent magnet array 1220 may include a plurality of permanent magnets 1221 and 1222 arranged in a circular cylinder manner and disposed on an inner face of the back cover 1210, wherein the permanent magnets 1221 and 1222 may be disposed to be spaced apart from the stator assembly 1100.

In one embodiment, the permanent magnet array 1220 includes a plurality of first permanent magnets 1221 magnetized in a positive radial direction (+X or +Y) and a plurality of second permanent magnets 1222 magnetized in a negative radial direction (−X or −Y). Alternatively, the first permanent magnets 1221 may be magnetized in the negative radial direction (−X or −Y), while the second permanent magnets 1222 may be magnetized in the positive radial direction (+X or +Y).

The first permanent magnets 1221 may be arranged and spaced apart from each other by a regular spacing, and symmetrically with each other with respect to a central-axis of the back cover 1210. In this regard, each of the first permanent magnets 1221 may have a length in the central-axis direction Z and a width in the circumferential direction. The lengths of the first permanent magnets 1221 may be substantially equal to each other. The widths of the first permanent magnets 1221 may be substantially equal to each other. In one embodiment, the inner face of the back cover 1220 may be uniformly divided into '2N+1' areas (N is a natural number) along the central-axis direction Z, wherein a width of each area may be equal to the length of each of the first permanent magnets 1221. In an odd-numbered area among the '2N+1' areas, 2M first permanent magnets 1221 (M is a natural number) may be arranged in a line along the circumferential direction and spaced from each other by a regular spacing, for example, substantially equal to the width of each of the first permanent magnets 1221. The different first permanent magnets 1221 disposed in different areas among the '2N+1' areas may be arranged in a line along a direction parallel to the central-axis of the back cover 1220. In one embodiment, as shown in FIG. 1, the inner face of the back cover 1220 may be divided into three areas arranged along the central-axis direction Z. In this case, the first permanent magnets 1221 may be disposed in the first area and the third area. In another embodiment, as shown in FIG. 3, the inner face of the back cover 1220 may be divided into five areas arranged along the central-axis direction Z. In this case, the first permanent magnets 1221 may be disposed in the first area, the third area, and the fifth area.

The second permanent magnets 1222 may be disposed between the first permanent magnets 1221 The second permanent magnets 1222 may be arranged and spaced from each other by a regular spacing, and may be arranged symmetrically with each other with respect to the central-axis of the back cover 1210.

In one embodiment, when the inner face of the back cover 1220 is uniformly divided into the '2N+1' areas (N is a natural number) along the central-axis direction Z, wherein a width of each area may be equal to the length of each of the first permanent magnets 1221, the second permanent magnets 1222 include a plurality of first extending magnets 1222*a*, each extending along first and second areas among the '2N+1' areas, and a plurality of second extending magnets 1222*b*, each extending along a (2N+1)-th area (a last area) and a 2N-th area (a next area to the last area). In one example, an even number of the first extending magnets 1222*a* and an even number of the second extending magnets 1222*b* may be disposed in corresponding areas so as to be arranged symmetrically with each other with respect to the central-axis of the back cover 1210. The even number of the first extending magnets 1222*a* and the even number of the second extending magnets 1222*b* may be equal to each other.

Each of the first extending magnets 1222*a* may have a length corresponding to a sum of widths of the first and second areas. Each of the second extending magnets 1222*b* may have a length corresponding to a sum of widths of the (2N+1)-th area and the 2N-th area. For example, the first second extending magnets 1222*a* and 1222*b* may have the same width and the same length. The width of each of the first second extending magnets 1222*a* and 1222*b* may be substantially the same as the width of each of the first permanent magnets 1221, and the length thereof may be twice the length of each of the first permanent magnets 1221.

In one embodiment, as shown in FIG. 1, the inner face of the back cover 1220 may be divided into three areas arranged along the central-axis direction Z. In this case, each of the first extending magnets 1222*a* may extend along the first area and the second area. Each of the second extending magnets 1222*b* may extend along the second area and the third area.

In another embodiment, as shown in FIG. 3, the inner face of the back cover 1220 may be divided into five areas arranged along the central-axis direction Z. In this case, each of the first extending magnets 1222*a* may extend along a first area and a second area, while each of the second extending magnets 1222*b* may extend along a fourth area and a fifth area.

In an embodiment, the second permanent magnets 1222 may further include a plurality of third magnets 1222*c* disposed in at least one even-numbered area among the '2N+1' areas. A width and a length of each of the third magnets 1222*c* may be substantially equal to the width and the length of each of the first permanent magnets 1221, respectively. In one example, the third magnets 1222*c* may be disposed to correspond to a space between adjacent first permanent magnets 1221 respectively disposed in adjacent odd-numbered areas among the '2N+1' areas.

In one embodiment, as shown in FIG. 1, the inner face of the back cover 1220 may be divided into the three areas arrange along the central-axis direction Z. In this case, the third magnets 1222*c* may be disposed in the second area.

In another embodiment, as shown in FIG. 3, the inner face of the back cover 1220 may be divided into five areas arranged along the central-axis direction Z. In this case, the third magnets 1222*a* may be disposed in the second area and the fourth area.

Hereinafter, in accordance with the present disclosure, forces and torques of 6 degrees of freedom acting on the rotor assembly 1200 via the interaction between the stator assembly 1100 and the rotor assembly 1200 will be described in detail.

Figure 4:
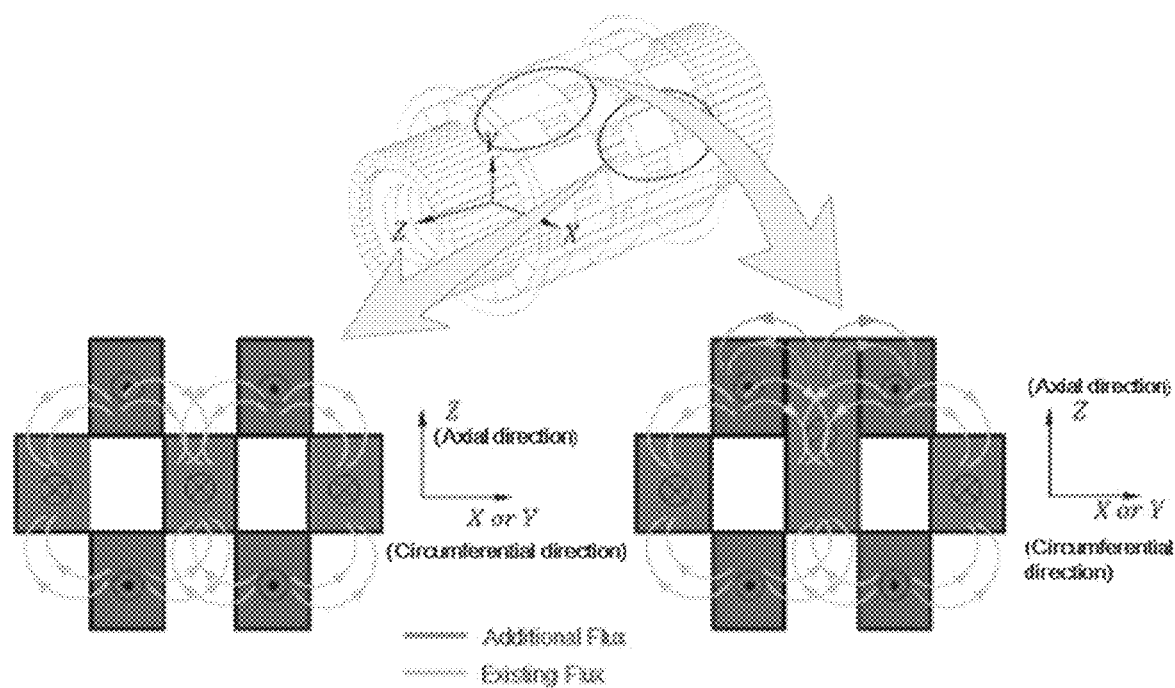
FIG. 4 is a diagram for illustrating a magnetic flux generated in the rotor assembly.
Figure 5:
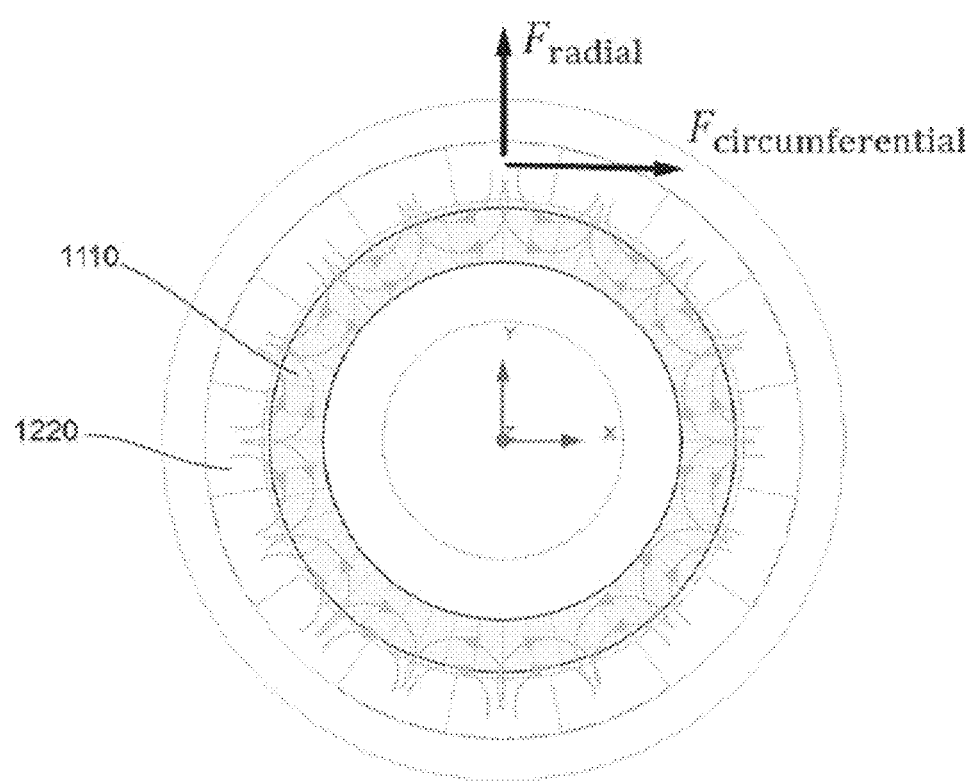
FIG. 5 is a diagram for illustrating a force applied to the rotor assembly via interaction between a circumferential directional magnetic flux generated in the rotor assembly and a first magnetic coil of the stator assembly.
Figure 6:
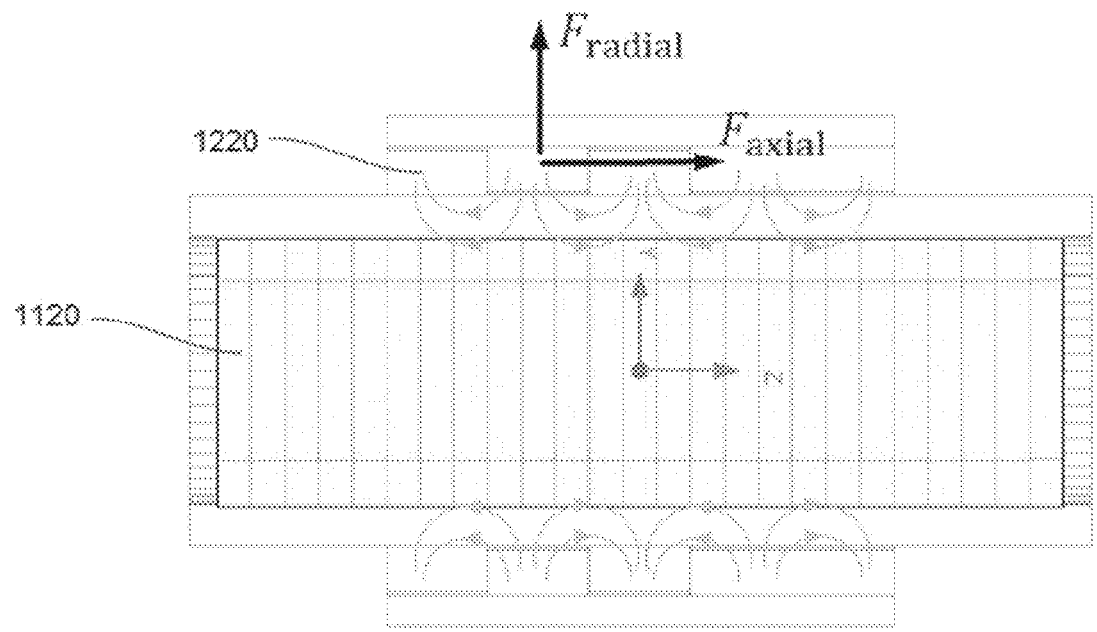
FIG. 6 is a diagram for illustrating a force applied to the rotor assembly via interaction between a central-axis directional magnetic flux generated in the rotor assembly and a second magnetic coil of the stator assembly.
Figure 7:
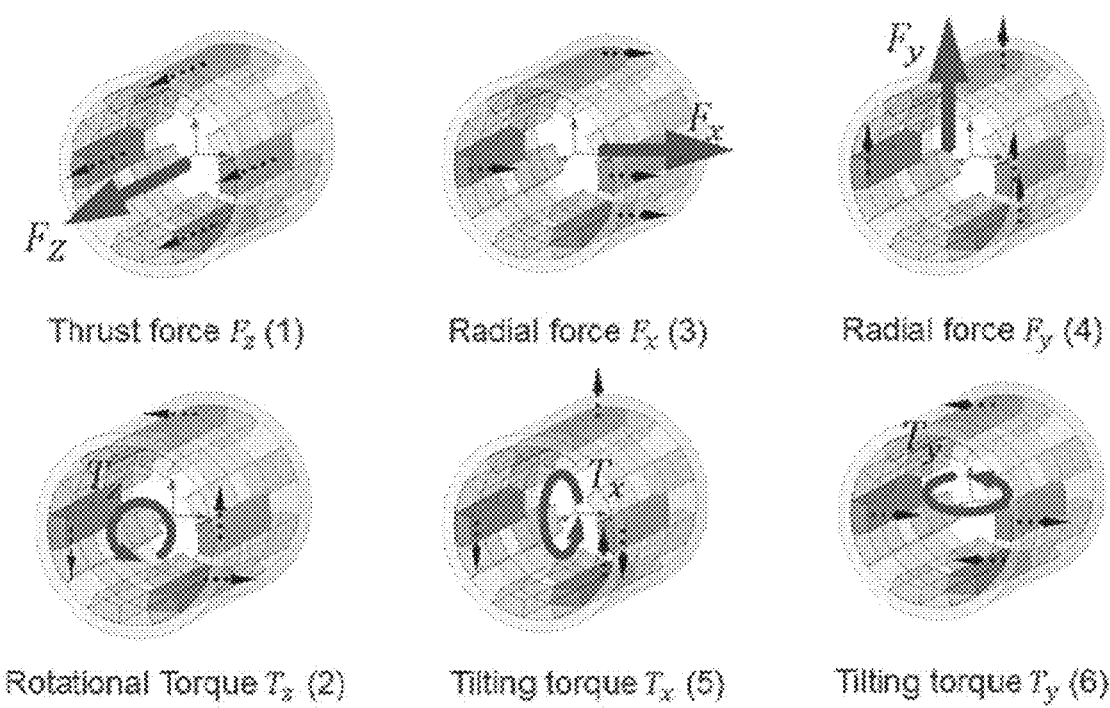
FIG. 7 is a diagram for illustrating torques and forces of six-degrees-of-freedom acting on the rotor assembly.

FIG. 4 is a diagram for illustrating the magnetic flux generated in the rotor assembly. FIG. 5 is a diagram for illustrating the force applied to the rotor assembly via the interaction between the circumferential directional magnetic flux generated in the rotor assembly and the first magnetic coil of the stator assembly. FIG. 6 is a diagram for illustrating the force applied to the rotor assembly via the interaction between the magnetic flux in the central-axis direction generated in the rotor assembly and the second magnetic coil of the stator assembly. FIG. 7 is a diagram for illustrating torques and forces of six-degrees-of-freedom acting on the rotor assembly.

Referring to FIG. 4 to FIG. 7, in the rotor assembly, a magnetic circuit as shown in FIG. 4 may be generated between the first permanent magnet magnetized in the positive radial direction and the second permanent magnet magnetized in the negative radial direction. Thus, a circumferential directional magnetic flux and a central-axis directional magnetic flux may be generated. At this time, an additional circumferential directional magnetic flux as shown in FIG. 4 may be generated by the first and second extending magnets respectively disposed in both opposing end areas of the rotor assembly. In accordance with the present disclosure, asymmetry of a force caused by this additional circumferential directional magnetic flux may be used to generate a torque (refer to "Tilting torque Tx" in FIG. 7) for rotating the rotor assembly about the first radial direction X, and to generate a torque (refer to "Tilting torque Ty" in FIG. 7) for rotating the rotor assembly around the second radial direction Y.

The magnetic flux in the circumferential direction may interact with the first magnetic coil to generate a torque (refer to "Rotational Torque Tz" in FIG. 7) for rotating the rotor assembly around the central-axis direction Z, the torque (refer to "Tilting torque Tx" in FIG. 7) to rotate the same around the first radial direction X, the torque (refer to "Tilting torque Ty" in FIG. 7) to rotate the same around the second radial direction Y, a force (refer to "Radial force Fx" in FIG. 7) to move the rotor assembly in the first radial direction X, and a force (refer to "Radial force Fy" in FIG. 7) that moves the same in the second radial direction Y.

In addition, the magnetic flux in the central-axis direction may interact with the second magnetic coil to generate a force (refer to "Thrust force Fz" in FIG. 7) to move the rotor assembly along the central-axis direction Z.

Figure 8:
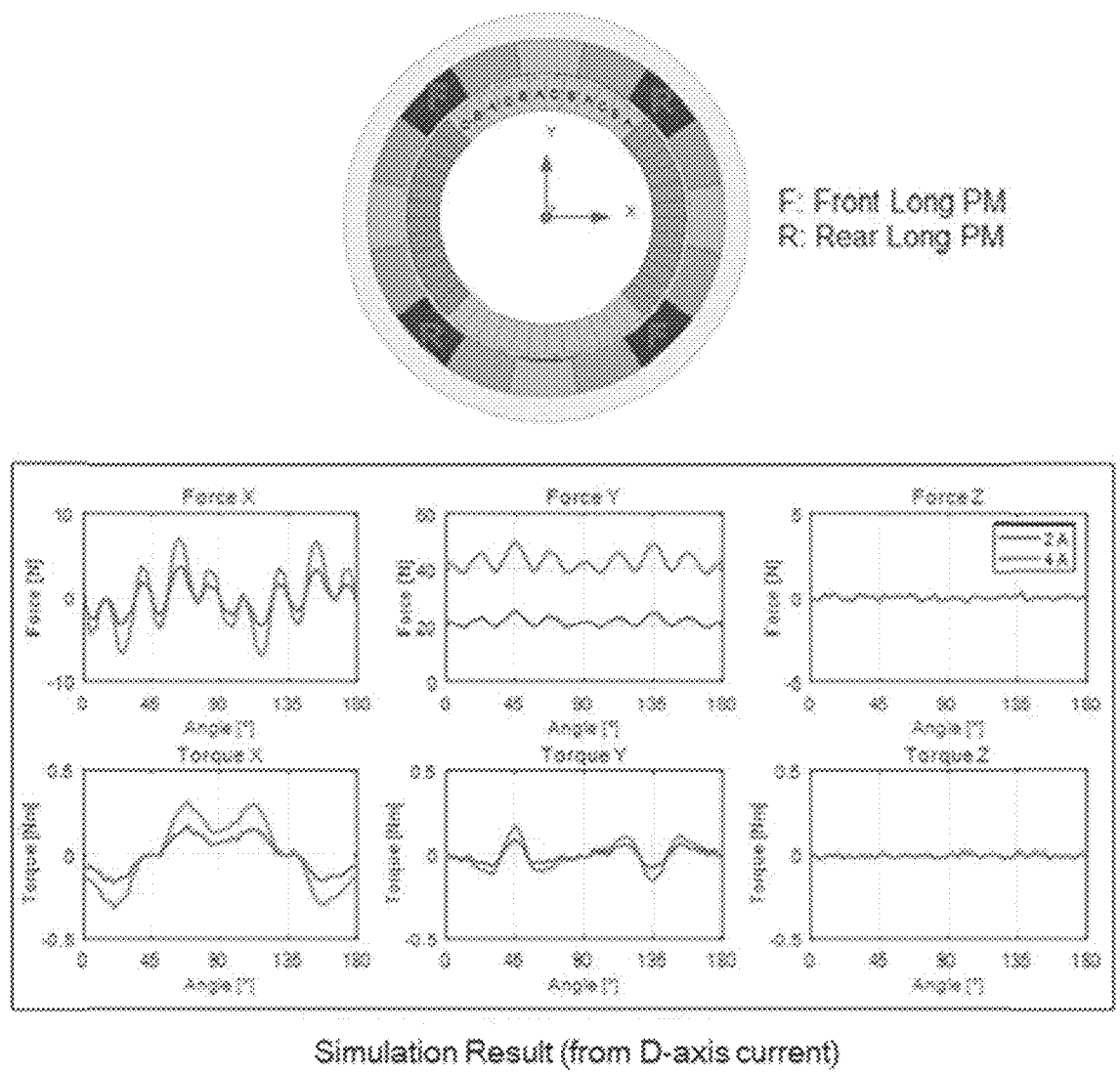
FIG. 8 show graphs of simulation results when the first magnetic coil is configured to have 4 coil groups in the motor device according to the present disclosure, and a D-axis current as a control current is applied only to a coil group in an orange area of a 12 o'clock direction and the remaining coil groups are turned off.

FIG. 8 show graphs of simulation results when the first magnetic coil is configured to have 4 coil groups in the motor device according to the present disclosure, and a D-axis current as a control current is applied only to a coil group in an orange area of a 12 o'clock direction and the remaining coil groups are turned off.

Referring to FIG. 8, it may be identified that Torque X and Torque Y of 2 degrees of freedom are generated by the first extending magnets (Front Long PM, F) and the second extending magnets (Rear Long PM, R) respectively disposed at both opposing ends of the rotor assembly.

Figure 9:
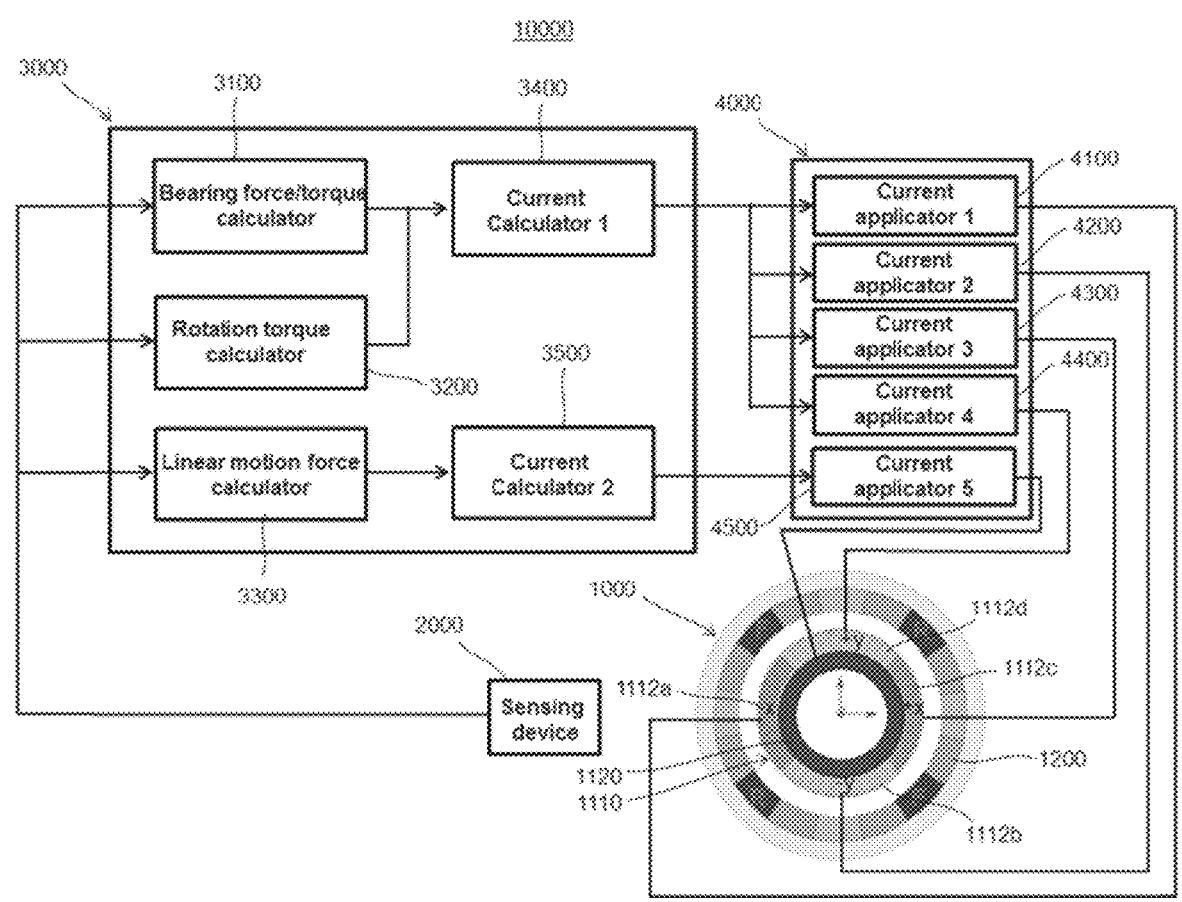
FIG. 9 is a diagram for illustrating a motor system according to an embodiment of the present disclosure.

FIG. 9 is a diagram for illustrating a motor system according to an embodiment of the present disclosure.

Referring to FIG. 9 together with FIG. 1 to FIG. 8, a motor system 10000 according to an embodiment of the present disclosure may include the motor device 1000, a sensing device 2000, a controller 3000 and a driver 4000.

The motor device 1000 may include the stator assembly 1100 and the rotor assembly 1200.

Since the motor device 1000 is substantially the same as the motor device 1000 as described above with reference to FIG. 1 to FIG. 8, a detailed redundant description thereof will be omitted below.

The stator assembly 1100 may include the first magnetic coil 1110 and the second magnetic coil 1120. The first windings 1112 of the first magnetic coil 1110 may include first to fourth coil groups 1112a, 1112b, 1112c, and 1112d respectively wound around first to fourth areas.

The sensing device 2000 may sense a relative position and motion of the rotor assembly 1200 with respect to the stator assembly 1100, and may generate an electrical sensed signal corresponding thereto. To this end, the sensing device 2000 may be disposed adjacent to the motor device 1000. As long as the sensing device 2000 detects the relative position and motion of the rotor assembly 1200 with respect to the stator assembly 1100 and generate the corresponding electrical sensed signal thereto, a configuration of the sensing device 2000 and types and structures of sensors thereof are not particularly limited.

The controller 3000 may be configured to calculate, is based on the sensed signal provided from the sensing device 2000, at least one of a first target torque for rotating the rotor assembly 1200 by a first angle around the central-axis direction Z of the stator assembly 1100, a second target torque for rotating the rotor assembly 1200 by a second angle around the first radial direction X thereof, a third target torque for rotating the rotor assembly 1200 by a third angle around the second radial direction Y thereof, a first target force to move the rotor assembly 1200 by a first distance in the first radial direction X thereof, a second target force for moving the rotor assembly 1200 in the second radial direction Y thereof by a second distance, and a third target force for moving the rotor assembly 1200 along the central-axis direction Z thereof. Then, the controller 3000 may be configured to calculate control currents to be applied to the first to fourth coil groups 1112a, 1112b, 1112c, and 1112d and the second windings 1122 of the second magnetic coil 1120 so as to generate the calculated target torques and/or target forces.

In an embodiment, the controller 3000 may include a bearing force/torque calculator 3100 configured to calculate at least one of the second target torque, the third target torque, the first target force, and the second target force based on the sensed signal provided from the sensing device 2000, a rotation torque calculator 3200 for calculating the first target torque based on the sensed signal provided from the sensing device 2000, and a linear motion force calculator 3300 for calculating the third target force based on the sensed signal provided from the sensing device 2000.

Further, the controller 3000 may further include a first current calculator 3400 that calculates control current values for generating the first target torque, the second target torque, the third target torque, the first target force and the second target force as calculated by the bearing force/torque calculator 3100 and the rotation torque calculator 3200, and a second current calculator 3500 for calculating a control current value for generating the third target force calculated by the linear motion force calculator 3300.

In an embodiment, the first current calculator 3400 may be configured to calculate the control current values for generating the second target torque, the third target torque, the first target force, and the second target force based on a following Equation 1:

$$\begin{bmatrix} F_x \\ F_y \\ T_x \\ T_y \end{bmatrix} = \overbrace{\begin{bmatrix} k_{11} & k_{12} & k_{13} & k_{14} \\ k_{21} & k_{22} & k_{23} & k_{24} \\ k_{31} & k_{32} & k_{33} & k_{34} \\ k_{41} & k_{42} & k_{43} & k_{44} \end{bmatrix}}^{K_B} \begin{bmatrix} d_{\pm x} \\ q_{\pm x} \\ d_{\pm y} \\ q_{\pm y} \end{bmatrix}. \quad \text{[Equation 1]}$$

In the Equation 1, $F_x$, $F_y$, $T_x$, and $T_y$ represent the first target force, the second target force, the second target torque, and the third target torque, respectively. $d_{\pm x}$, $q_{\pm x}$, $d_{\pm y}$ and $q_{\pm y}$ represent a d-axis control current and a q-axis control current in each coil group. The $K_B$ matrix denotes a function representing a relationship between the target force and torques and the control currents.

Further, the first current calculator 3400 may calculate the control current for generating the first target torque using $K_R$ [Nm/A] as a constant representing a ratio of a force/torque to a peak of three-phase currents in a general rotary/linear motor.

In one example, the first current calculator 3400 may convert each of the d-axis control current and the q-axis control current calculated based on the above Equation 1 and the control current calculated using the constant $K_R$ to three-phase control currents, based on a following Equation 2:

$$\begin{bmatrix} i_a \\ i_b \\ i_c \end{bmatrix} = \begin{bmatrix} \cos\alpha & -\sin\alpha \\ \cos\left(\alpha - \frac{2\pi}{3}\right) & -\sin\left(\alpha - \frac{2\pi}{3}\right) \\ \cos\left(\alpha + \frac{2\pi}{3}\right) & -\sin\left(\alpha + \frac{2\pi}{3}\right) \end{bmatrix} \begin{bmatrix} i_d \\ i_q \end{bmatrix} \quad \text{[Equation 2]}$$

In the above Equation 2, a represents a rotation angle around the first radial direction.

Further, a combination of the control current for generating each of the first target force, the second target force, the second target torque, and the third target torque and the control current for generating the first target torque may be applied to the first windings 1112 of the first magnetic coil 1110. Thus, the first current calculator 3400 may sum the control current value for generating each of the first target force, the second target force, the second target torque, and the third target torque, and the control current value for generating the first target torque with each other, based on a following Equation 3, and may provide the summation result to the driver 4000:

$$\begin{bmatrix} i_{a,final} \\ i_{b,final} \\ i_{c,final} \end{bmatrix} = \overbrace{\begin{bmatrix} 1 & 0 & 0 & 1 & 0 & 0 \\ 0 & 1 & 0 & 0 & 1 & 0 \\ 0 & 0 & 1 & 0 & 0 & 1 \end{bmatrix}}^{W} \begin{bmatrix} i_{a,RA} \\ i_{b,RA} \\ i_{c,RA} \\ i_{a,MB} \\ i_{b,MB} \\ i_{c,MB} \end{bmatrix} \quad \text{[Equation 3]}$$

In the above Equation 3, RA and MB represent a rotational actuator and a magnetic bearing, respectively.

The second current calculator 3500 may calculate the control current value for generating the third target force using KL [N/A] as a constant representing a ratio of a force/torque to a peak of three-phase currents in a general rotary/linear motor. In one example, the second current calculator 3500 may convert the control current calculated using the constant KL into three-phase control currents based on the following Equation 2 and provide the converted control currents to the driver 4000.

The driver 4000 may generate control currents from an external power source based on the control current values provided from the controller 3000, and may apply the generated control currents to the first to fourth coil groups 1112a, 1112b, 1112c, and 1112d of the first magnetic coil 1110 and the second windings 1122 of the second magnetic coil 1120.

In an embodiment, the driver 4000 may include first to fourth current applicators 4100, 4200, 4300, and 4400 respectively connected to the first to fourth coil groups 1112a, 1112b, 1112c, and 1112d so as to apply independent control currents thereto, and a fifth current applicator 4500 for applying the control current to the second windings 1122. The first to fourth current applicators 4100, 4200, 4300, and 4400 may generate the control currents based on the control current values provided from the first current calculator 3400 and then may apply the generated control currents to the first to fourth coil groups 1112a, 1112b, 1112c, and 1112d, respectively. The fifth current applicator 4500 may generate the control current based on the control current value provided from the second current calculator 3500 and apply the generated control current to the second windings 1122.

According to the motor device according to the present disclosure and the motor system having the same, the rotor assembly may be capable of the linear motion and the rotation motion with respect to the stator assembly, and further, may achieve magnetic bearing function via magnetic levitation using the torque rotating the same about the first radial direction X, the torque rotating the same around the second radial direction Y, the force moving the same in the first radial direction X, and the force moving the same in the second radial direction Y.

The descriptions of the presented embodiments have been provided so that a person of ordinary skill in the art of any the present disclosure may use or practice the present disclosure. Various modifications to these embodiments will be apparent to those skilled in the art of the present disclosure, and the general principles defined herein may be applied to other embodiments without departing from the scope of the present disclosure. Thus, the present disclosure is not intended to be limited to the embodiments presented herein, but is to be construed in the widest scope consistent with the principles and novel features presented herein.

What is claimed is:

1. A motor device comprising:
   a stator assembly including:
      a first support in a form of a circular cylinder;
      a first magnetic coil including first windings wound around an outer face and an inner face of the first support and in a direction parallel to a first direction as a central-axis direction of the first support;
      a second support in a form of a circular cylinder disposed inside or outside the first support; and
      a second magnetic coil including second windings wound around a surface of the second support and in a circumferential direction of the second support; and
   a rotor assembly including a permanent magnet array, wherein the array includes:
      a plurality of first permanent magnets magnetized in a positive or negative radial direction; and
      a plurality of second permanent magnets including first and second extending magnets magnetized in an opposite direction to the magnetized direction of the first permanent magnets, wherein each of the first and second extending magnets has a length greater than each of the first permanent magnets,
   wherein the first and second permanent magnets are arranged symmetrically about the central-axis and are arranged in a form of a circular cylinder surrounding the stator assembly,
   wherein the first and second extending magnets are respectively disposed in a first end area and a second end area opposite to each other of the rotor assembly.

2. The device of claim 1, wherein a surface of the first support is divided into a plurality of areas arranged along a circumferential direction thereof and arranged consecutively,
   wherein the first windings include a plurality of coil groups respectively wound around the plurality of areas,
   wherein control currents are individually applied to the plurality of coil groups independently of each other.

3. The device of claim 1, wherein each of the first and second supports is made of a non-magnetic material.

4. The device of claim 1, wherein the rotor assembly further includes a circular cylinder-shaped back cover surrounding the permanent magnet array,
   wherein an inner face of the back cover is divided into 2N+1 areas (N is a natural number) arranged along a central-axis direction thereof, wherein each of the 2N+1 areas has a width as a first length of each of the first permanent magnets,
   wherein in an odd-numbered area among the 2N+1 areas, the first permanent magnets are arranged in a line along the circumferential direction and are spaced apart from each other by an equal spacing,
   wherein each of the first extending magnets extends along first and second areas among the 2N+1 areas,
   wherein each of the second extending magnets extends along an (2N+1)-th area and an 2N-th area among the 2N+1 areas.

5. The device of claim 4, wherein the first and second extending magnets have the same width and the same length, and the length of each of the first and second extending magnets is twice the length of each of the first permanent magnets.

6. The device of claim 4, wherein the second permanent magnets further include a plurality of third magnets disposed in at least one even-numbered area of the 2N+1 areas,
   wherein each of the plurality of third magnets has the same width and the same length as a width and the length of each of the first permanent magnets, respectively.

7. The device of claim 6, wherein each of the third magnet is positioned to correspond to a space between adjacent first permanent magnets respectively disposed in adjacent odd-numbered area among the 2N+1 areas.

8. The device of claim 4, wherein a first torque for rotating the rotor assembly around a first radial direction and a second torque for rotating the rotor assembly around a second radial direction perpendicular to the first radial direction are generated by the first and second extending magnets.

9. A motor system comprising:
   a motor device including:
      a stator assembly including:
         a first support in a form of a circular cylinder, wherein a surface of the first support is divided into a plurality of areas arranged along a circumferential direction thereof and arranged consecutively;
         a first magnetic coil including first windings having a plurality of coil groups wound around inner and outer faces of the first support and respectively wound around the plurality of areas of the first support and in a direction parallel to a first direction as a central-axis direction of the first support;

a second support in a form of a circular cylinder disposed inside or outside the first support; and a second magnetic coil including second windings wound around a surface of the second support and in a circumferential direction of the second support; and a rotor assembly including a permanent magnet array, wherein the array includes:

a plurality of first permanent magnets magnetized in a positive or negative radial direction; and a plurality of second permanent magnets including first and second extending magnets magnetized in an opposite direction to the magnetized direction of the first permanent magnets, wherein each of the first and second extending magnets has a length greater than each of the first permanent magnets, wherein the first and second permanent magnets are arranged symmetrically about the central-axis and are arranged in a form of a circular cylinder surrounding the stator assembly, wherein the first and second extending magnets are respectively disposed in a first end area and a second end area opposite to each other of the rotor assembly;

a sensing device for sensing relative positions and motions of the rotor assembly with respect to the stator assembly, and for generating an electrical sensed signal corresponding thereto;

a controller configured to:

calculate, based on the sensed signal, at least one of:

a first target torque for rotating the rotor assembly by a first angle around the central-axis direction of the stator assembly;

a second target torque for rotating the rotor assembly by a second angle around a first radial direction thereof;

a third target torque for rotating the rotor assembly by a third angle around a second radial direction;

a first target force to move the rotor assembly by a first distance in the first radial direction;

a second target force for moving the rotor assembly in the second radial direction by a second distance; or a third target force for moving the rotor assembly along the central-axis direction; and calculate control current values to be applied to first to fourth coil groups and the second windings to generate the calculated target torques and forces, wherein the plurality of coil groups include the first to fourth coil groups; and a driver configured to generate control currents from an external power source, based on the calculated control current values and to apply the generated control currents to the first to fourth coil groups and the second windings.

10. The system of claim 9, wherein the controller includes:

a bearing force/torque calculator for calculating at least one of the second target torque, the third target torque, the first target force, and the second target force, based on the sensed signal;

a rotation torque calculator for calculating the first target torque based on the sensed signal;

a linear motion force calculator for calculating the third target force based on the sensed signal;

a first current calculator for calculating the control current values for generating the first target torque, the second target torque, the third target torque, the first target force, and the second target force calculated by the bearing force/torque calculator and the rotation torque calculator are calculated; and a second current calculator for calculating the control current value for generating the third target force calculated by the linear motion force calculator.

11. The system of claim 10, wherein the driver includes:

first to fourth current applicators respectively connected to the first to fourth coil groups so as to independently apply the control currents thereto; and a fifth current applicator for applying the control current to the second windings.

* * * * *